United States Patent Office 3,147,394
Patented Sept. 1, 1964

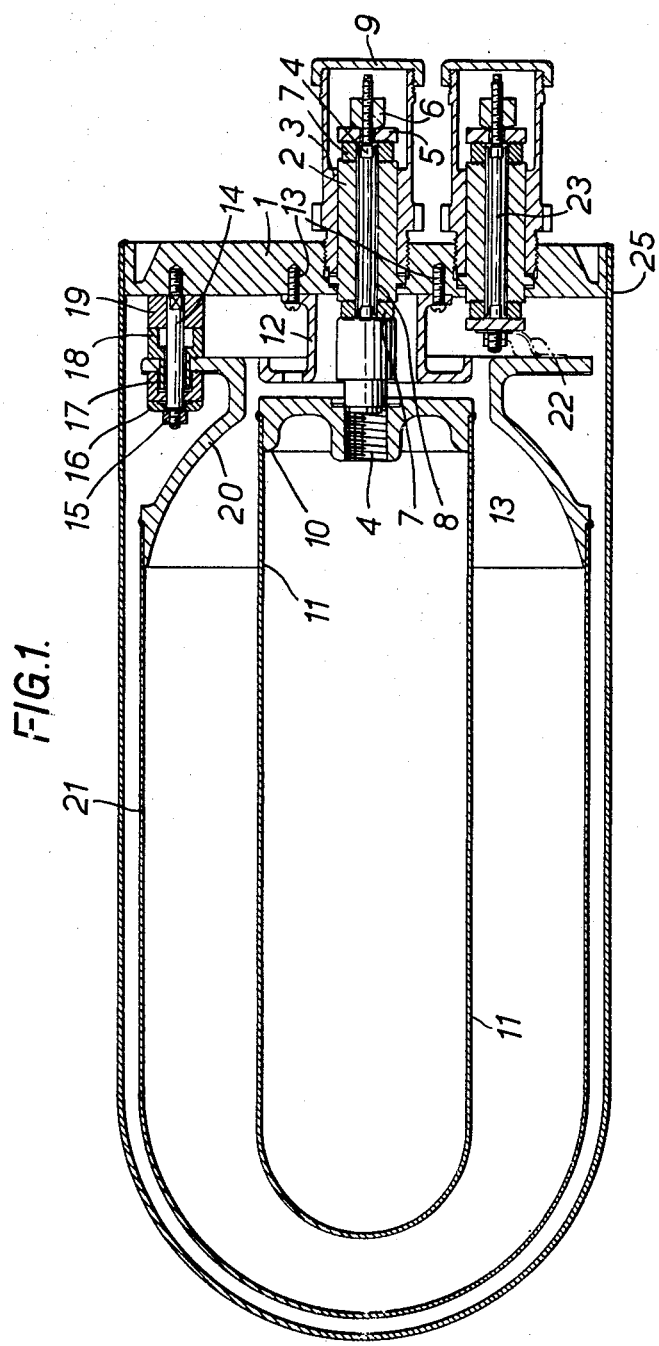

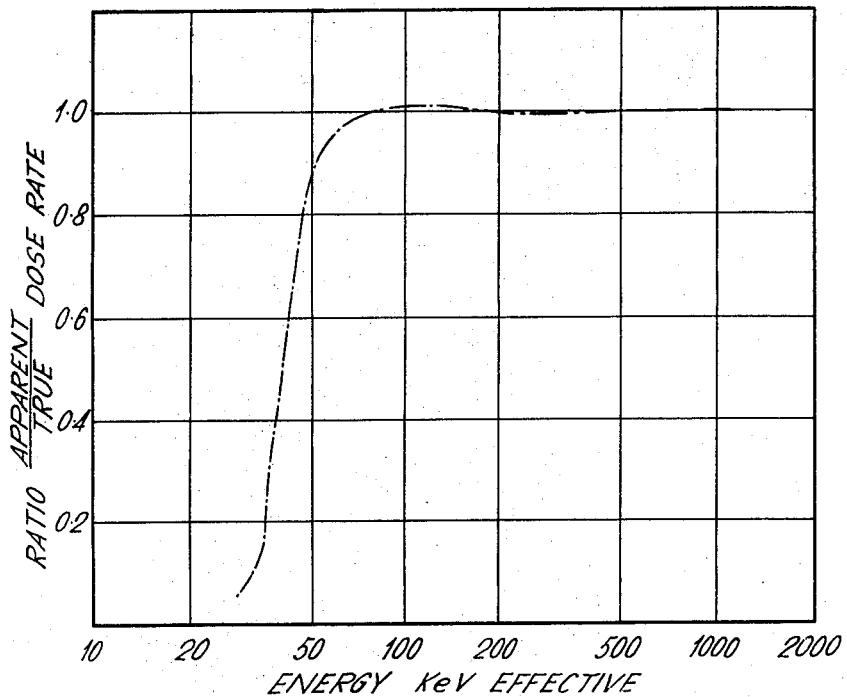
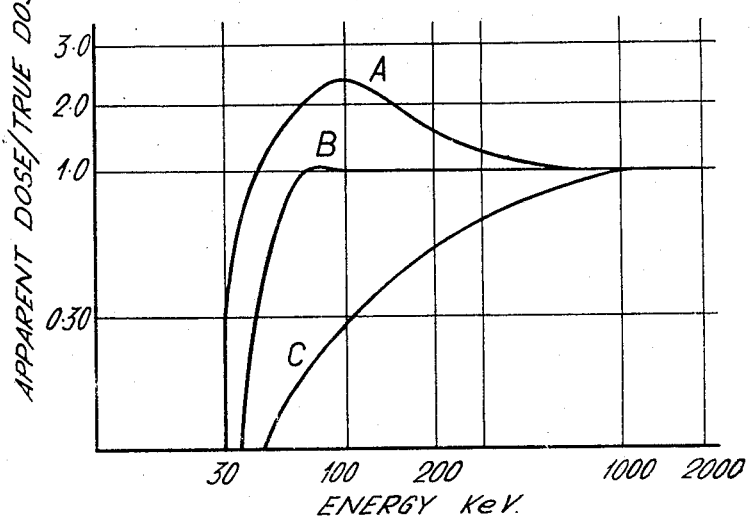

3,147,394
IONISATION CHAMBER
Norman Trevor Clarke, Pamber Heath, Basingstoke, England, assignor to the United Kingdom Atomic Energy Authority, London, England
Filed Jan. 9, 1961, Ser. No. 81,465
Claims priority, application Great Britain Jan. 13, 1960
1 Claim. (Cl. 313—93)

This invention relates to detectors of penetrative radiation and is particularly concerned with detectors for gamma radiation.

The use of detectors of penetrative radiation in the field is of great importance in checking that there has been no significant increase in the radio activity to which the population is exposed. Damaging radiations which could be present have a wide range of energy. Thus for example $Co^{60}$ emits gamma radiation of 0.06, 1.1, and 1.3 mev. energy.

To measure biological dose down to brackground levels of $\gamma$ radiation, that is down to about 10 $\mu r./hr.$ it is preferable to use a pressurised ionisation chamber. The measurements could be carired out only with difficulty with scintillation counters or Geiger counter systems because compensation for the poor energy response of the detectors is difficult. In a pressurised ionisation chamber the wall thickness has to be increased to cope with the increased pressure and this causes a lower response at the lower energies.

An object of the invention is to provide a pressurised ionisation chamber having an almost flat energy response down to low energies of gamma radiation.

The invention consists in a gas filled ionisation chamber wherein the gas consists of a mixture of air and argon in the proportions 55 to 65 volume percent argon and 45 to 35 volume percent air. The total pressure of the gases is desirably in the range 18 to 22 atmospheres.

An embodiment of the invention will now be described with reference to the accompanying drawing wherein:

FIGURE 1 is a side elevation, in section, of an ionisation chamber.

FIGURES 2 and 3 are energy response curves for an ionisation chamber.

In the drawing a main plate 1 carries a sleeve 2 held in position by a threaded cover 3. A supporting pin 4 is mounted on sleeve 2 by means of plate 5 and nut 6. Quartz insulators 7 and porcelain sleeve 8 insulate sleeve 2 from pin 4. A cap 9 closes the open end of the cover 3. Pin 4 carries at a threaded extremity an annular support 10 on which is tack welded a collector electrode 11. A screening shroud 12 is fixed to plate 1 by screws 13.

Three studs 14 (only one being shown) are fixed in plate 1 and fix in position (by nut 15, spacer 16 and porcelain insulators 17 and 18 and spacer 19) a dome mounting 20 to which is tack welded a high tension polarising electrode 21. A conductor strip 22 is bolted to mounting 20 and held against pin 23 by nut 24. Pin 23 is fixed to plate 1 by means similar to that used for pin 4. Plate 1 caries a cover 25 fixed by tack welding.

Tests were carried out using this chamber and the results of FIGURES 2 and 3 were obtained. In FIGURE 2 and curve B of FIGURE 3 results were obtained with a filling of 12 atmospheres pressure of argon and 8 atmospheres pressure of air. Curve A of FIGURE 3 was obtained with 20 atmospheres pressure of argon, and curve C was obtained with 20 atmospheres pressure of air. The radiation was obtained from the following sources and from a 250 kv. filtered X-ray unit.

| Isotope | Energy Mev. | R./hr./mc. at 1 cm. (K factor) |
|---|---|---|
| Co—60 | 1.25 | 13 |
| Ra—226 | 0.8 | 8.4 |
| Es—137 | 0.661 | 3.1 |
| Au—198 | 0.411 | 2.3 |
| Hg—203 | 0.280 | 1.1 |
| Th—170 | 0.084 | 0.05 |

The sensitivity of the chamber for one m.p.l. 7.5 mr./hr. of gamma radiation was $8.1 \times 10^{-11}$ A.

I claim:

A gas filled ionisation chamber having an almost flat energy response due to low energies of gamma radiation wherein the gas present therein consists of a mixture of air and argon in the proportions 55 to 65 volume percent argon and 45 to 35 volume percent air, the total gas pressure in said ionisation chamber being 18 to 22 atmospheres.

References Cited in the file of this patent
UNITED STATES PATENTS 2,351,028   Fearon   June 13, 1944
2,376,196   Scherbatskoy   May 15, 1945

OTHER REFERENCES

Electron and Nuclear Counters, by Korff, D. Van Nostrand Co., New York, second edition, 1955, pages 21 to 53.

MDDC–458 Operation of Proportional Counters of Pressures Above Atmospheric, by Diven, Atomic Energy Commission Publication.